United States Patent [19]

Simko

[11] Patent Number: 5,069,175
[45] Date of Patent: Dec. 3, 1991

[54] CHARGE INTAKE SYSTEM FOR A MULTI-INTAKE VALVE PER CYLINDER ENGINE

[75] Inventor: Aladar O. Simko, Dearborn Heights, Mich.

[73] Assignee: Ford Motor Company, Dearborn, Mich.

[21] Appl. No.: 596,436

[22] Filed: Oct. 12, 1990

[51] Int. Cl.[5] .................................................. F02B 15/00
[52] U.S. Cl. ............................... 123/193 H; 123/432; 123/190 A
[58] Field of Search ............ 123/432, 315, 308, 90.22, 123/190 A, 59 AL, 193 H

[56] References Cited

U.S. PATENT DOCUMENTS

| | | | |
|---|---|---|---|
| 1,712,434 | 5/1929 | Hedglin | 123/59 AL |
| 1,737,599 | 12/1929 | Long | 123/59 AL |
| 2,215,911 | 9/1940 | Peterson | 123/59 AL |
| 2,798,466 | 7/1957 | Rzepecki | 123/190 A |
| 3,534,716 | 10/1970 | Odawara et al. | 123/190 A |
| 3,750,698 | 8/1973 | Walchle et al. | 137/375 |
| 4,240,387 | 12/1980 | Motosugi et al. | 123/52 M |
| 4,317,438 | 3/1982 | Yagi et al. | 123/432 |
| 4,512,311 | 4/1985 | Sugiyama | 123/432 |
| 4,576,131 | 3/1986 | Sugiyama | 123/432 |
| 4,628,880 | 12/1986 | Aoyama et al. | 123/432 |
| 4,703,734 | 11/1987 | Aoyama et al. | 123/432 |
| 4,726,341 | 2/1988 | Muranaka et al. | 123/432 |
| 4,766,866 | 8/1988 | Takii et al. | 123/432 |
| 4,938,191 | 7/1990 | Oldani et al. | 123/432 |
| 4,944,261 | 7/1990 | Coates | 123/190 A |

Primary Examiner—David A. Okonsky
Attorney, Agent, or Firm—Jerome R. Drouillard; Clifford L. Sadler

[57] ABSTRACT

An automotive type fuel injection engine has for each cylinder a single intake manifold runner or log connected by siamesed flow passages to multiple side-by-side intake ports in the cylinder head. A fuel injector is installed in the runner upstream of the dividing portion of the runner. A single constant diameter bore is provided through the cylinder head close to the intake ports intersecting the siamesed flow passages at right angles. The bore contains a one-piece rotatable paddle-like valve with a thin plate in a flow passage, the valve being variable rotatable to close off the passage for fuel economy and power control. The valve is self-contained with sealing and guidance disks.

16 Claims, 2 Drawing Sheets

CHARGE INTAKE SYSTEM FOR A MULTI-INTAKE VALVE PER CYLINDER ENGINE

FIELD OF THE INVENTION

This invention relates in general to a charge intake system for a fuel injected automotive type engine. More particularly, it relates to one having more than one intake valve per cylinder, and a deactivation or charge flow blocking valve for selectively controlling flow into the intake ports.

BACKGROUND OF THE INVENTION

It is well known that engines designed with two intake valves per cylinder are capable of producing high horsepower levels. This capability is maximized when both ports receive an equal amount of fuel. A single injector spraying into both tracks or runs of a siamesed intake manifolding arrangement, such as shown in FIG. 1A, can economically provide for this fueling requirement.

Stringent NOx emission control requirements can be met without fuel efficiency loss if the burn rate in the engine is sustained at an optimal level while introducing high rates of charge diluting EGR to suppress knocking. Desired control of burn rate can be achieved by blocking most or all of the air flow to one of the ports. If a flow deactivator or control valve is installed into the siamesed port arrangement shown, for example, in FIGS. 1B and 1C upstream of the injector, the burn rate improvement is inadequate because the siamesing connection still allows sufficient air to cross over into and bypass the supposedly deactivated port. Good burn rate control has been achieved with separated ports, one of them being deactivated, such as is shown in FIG. 1D, with fuel being injected into the active port. However, the drawback to this arrangement is that when both ports are open, only half of the air is impregnated with fuel. This leads to some power and fuel economy losses.

If a port deactivator or control valve is applied to a siamesed port layout downstream of the siamesed section, again FIG. 1A, the active port induces high swirl rate into the cylinder; however, some concern might be had about fuel being injected to both the active and the inactive port. Experimental results with separate ports, one of them being deactivated, however, indicate that half of the fuel can continue to be injected into the inactive port without detrimental effects. The reasons for this are:

1. Backflow during overlap between the exhaust and intake cycles, and a slight leakage through the deactivated valve will carry the fuel into the cylinder.

2. Swirl induced by the biasing of the air flow into one passage is so beneficial for mixing and burn rate that the possible detrimental effect of fuel stratification is completely eliminated.

It follows from the above that there can be two alternative resolutions that could achieve optimal results.

1. Twin porting with a very small siamesed section, adequate only for the installation of a unique injector having two spray holes about 8-10 mm apart so that fuel is introduced to both ports from one injector. The port deactivation valve would be upstream of the injector.

2. Conventional siamesed porting with a deactivation valve downstream of the siamesed section, such as is illustrated in FIG. 1A.

This invention is directed to the use of a one-piece deactivation or control valve that can be installed into the cylinder head intersecting all of the multiple intake valve passages and situated close to the intake ports, thereby facilitating the use of conventional siamesed porting and fueling, such as is shown in FIG. 1A.

Takii et al. U.S. Pat. No. 4,766,866 shows a charge intake system similar to that shown herein in FIG. 1C. More particularly, it shows a cylinder with three intake valves 24, 25, 26 receiving a charge from a passage 31, with individual runners or logs 37 and 38 upstream of a fuel injector 32. One of each pair of the logs can be controlled by a butterfly type valve 41, 42, the valves being mounted on a common shaft 43. It should be noted that the valves in this case are upstream of the fuel injector and also outside of the cylinder head, and require separate mounting of the valve, per se, to a shaft, in contrast to the construction to be described.

Aoyama et al. U.S. Pat. No. 4,703,734 shows a charge intake system having two intake valves per cylinder connected by separated passages to a common intake passage leading into the cylinder head. In this case, a fuel injection valve 30 is mounted in one passage and a deactivation or flow control valve 8 is mounted in the other passage, in a manner similar to that shown in FIG. 1D herein. The butterfly type valves are fixed to a common shaft. Here again, as in FIG. 1D herein, only half of the air is impregnated with fuel when both ports are open.

Aoyama et al. U.S. Pat. No. 4,628,880 is another example of an engine having two intake valves per cylinder with separated intake passages, one containing a deactivation or control valve, and the other the fuel injection valve. The disadvantages of this construction are as described above in connection with U.S. Pat. No. 4,703,734.

Yagi et al. U.S. Pat. No. 4,317,438 and Motosugi et al. U.S. Pat. No. 4,240,387 are examples of engines with one or more intake valves and deactivation or control valves regulating the charge flow into the cylinders. However, in each case, there is no fuel injection valve and the mixture is supplied by a carburetor. Furthermore, in each case, the multiple control valves appear to be individually attached to a single shaft outside of the cylinder head.

Sugiyama U.S. Pat. No(s). 4,512,311 and 4,576,131, both show a multi-intake valve per cylinder engine having a common intake runner and separated siamesed passages to the intake ports. FIG. 4 shows one of the passages being controlled by a deactivation or control valve to regulate the flow from a fuel injector mounted upstream of both passages. It will be noted, however, that the individual deactivation or control valves appear to be individually attached to a common shaft; and that the shaft is mounted outside of the cylinder head and therefore not close to the intake ports, and is not of a simplified construction, such as is to be described hereinafter. The outside mounting increases the length of the divided passages and, therefore, eliminates the use of conventional siamesed passages.

Walchle et al. U.S. Pat. No. 3,750,698 is cited merely as an illustration of a valve having a polytetrafluoroethylene coating for reducing friction.

SUMMARY OF THE INVENTION

As stated previously, the invention is directed to the use of a one-piece deactivation or control valve that is installed within the cylinder head close to the intake ports so that conventional siamesed porting constructions can be used. This simplifies the construction and provides for an economical assembly. As will be described, the deactivation or control valve in this case is a die casting of aluminum around a central steel rod and contains the end disks for sealing between the flow passages. Integral with it are individual flat plate valves or a valve for selectively controlling the charge flow into the various intake ports. The valve in this case is inserted by sliding into a bore of constant diameter provided in the cylinder head.

Therefore, it is a primary object of the invention to provide a charge intake system for a multi-intake valve per cylinder engine that includes a port deactivation or control valve of a unique construction that simplifies the assembly and reduces the cost of manufacture, and yet provides finite control of the charge flow into the engine.

Another object of the invention is to provide a deactivation or control valve of the type described above that consists of a simple barrel type, paddle-like valve slidably insertable into a constant diameter bore directly into the cylinder head per se, to permit the use of conventional siamesed passage manifolding connected to the cylinder head.

BRIEF DESCRIPTION OF THE DRAWINGS

Other objects, features, and advantages of the invention will become more apparent upon reference to the succeeding, detailed description thereof, and to the drawings illustrating the preferred embodiment thereof; wherein.

DESCRIPTION OF THE PREFERRED EMBODIMENT

Figures 1A, 1B, 1C, 1D:
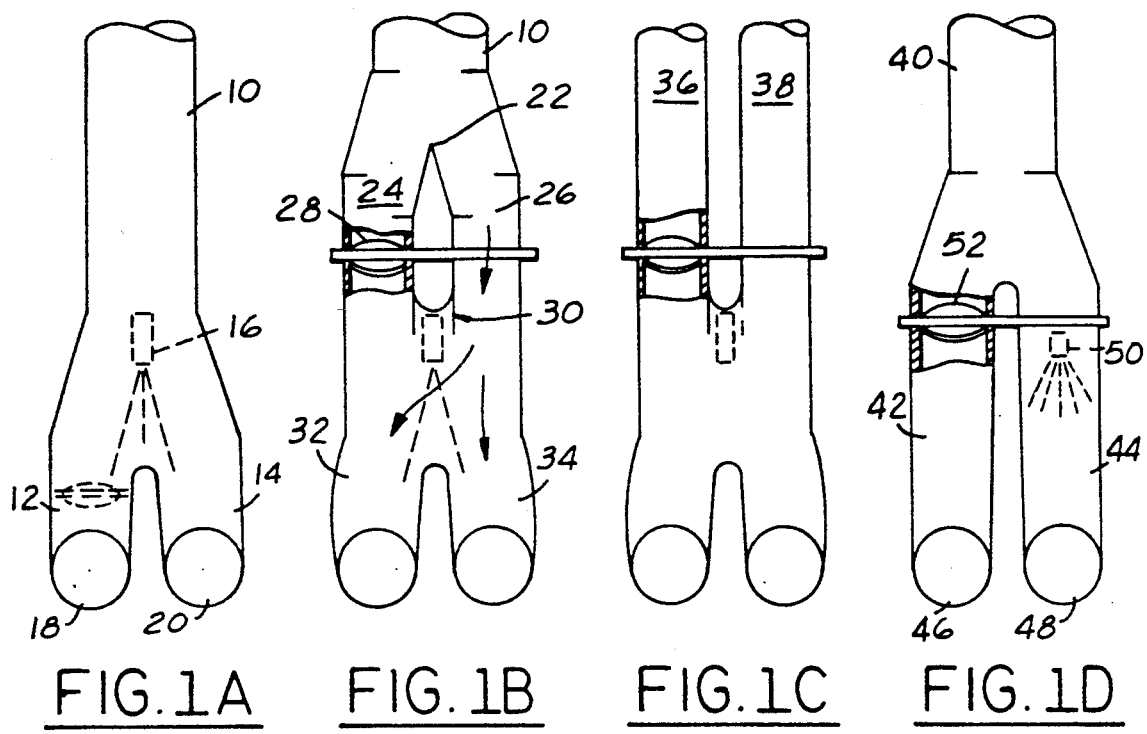
FIGS. 1A, 1B, 1C and 1D are schematic illustrations of various type engine charge intake systems for conveying air and fuel to a multiple intake port engine.

FIGS. 1A, 1B, 1C and 1D have already been described above in connection with a discussion of the prior art. However, briefly, FIG. 1A shows an engine intake manifolding consisting of a single intake passage, or runner, or log, 10, that is bifurcated or divided at its lower portion to provide two siamesed passages 12 and 14. A fuel injection valve 16 is located at the point of bifurcation upstream of the two passages. The separated passages 12 and 14 lead to individual intake ports 18 and 20 located in the cylinder head.

FIG. 1B shows a construction in which the single intake log or runner 10 is divided at 22 into two branch passages 24 and 26, passage 24 containing a deactivation or flow control valve 28. Downstream, the passages recombine momentarily past a fuel injection valve 30 before being subdivided again into a pair of siamesed passages 32 and 34.

FIG. 1C shows a construction similar to FIG. 1B except that the primary air intake is provided by separate intake passages 36 and 38. Otherwise, the construction is the same as that described in connection with FIG. 1B.

FIG. 1D shows a single runner or log 40 subdivided into separate intake passages 42 and 44 for separate connection into the intake ports 46 and 48. A fuel injector 50 is installed in the one passage 44 while a deactivation or control valve 52 is installed in the other passage 42.

Figure 2:
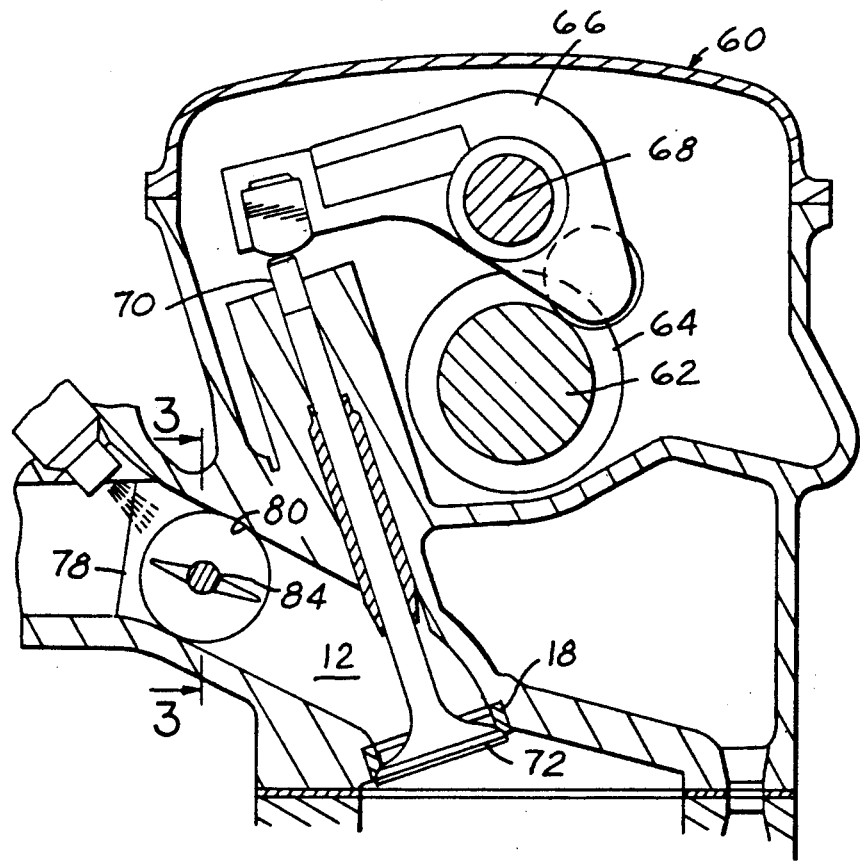
FIG. 2 is an enlarged cross-sectional view of a portion of the cylinder head of an engine embodying the invention.

FIG. 2 shows more specifically the construction of a cylinder head and adjoining parts embodying the invention. A cylinder head 60, in this case, encloses a valve train of the overhead cam type, as indicated by the camshaft 62 having a cam 64 secured thereto. A roller finger follower type rocker arm 66, having a fulcrum 68, engages the cam 64 at one end and the stem 70 of an intake valve 72 at its opposite end. Valve 72 is reciprocably movable into or out of a non-circular (see FIG. 3) intake port 18, commonly provided in the cylinder head. The intake port is connected by a non-circular passage 12 to the outside face of the cylinder head indicated schematically at 78.

In the passage 12, closely adjacent the port 18, is provided a constant diameter bore 80 drilled straight through the cylinder head longitudinally and transverse to passages 12 and 14. It is vertically aligned insofar as the cylinder head is concerned with the top portion of the head just outside where the cylinder head bolts normally are provided, but not shown in this particular installation. The head bolts, four of them to each cylinder, usually straddle the cylinder as close to the cylinder as manufacturing will permit. This leaves a space between the head bolts and the outer face of the cylinder head, especially in the case of the angled intake valves and intake ports shown. This space otherwise is not used, but in this particular case, is used to incorporate the deactivation or control valve in the bore 80.

More particularly, as stated, a cylindrical hole 80 is machined through the cylinder head lengthwise, just outside of the head bolts, as described. The hole intersects all of the intake passages, as shown more clearly in FIG. 3, the passage cross-sections being indicated by dotted lines 12, 14. The diameter of hole 80 is slightly larger than the height of the passages 12, 14. The two intake passages of each cylinder at the hole centerline are separated; however, as indicated in FIG. 1A, they are joined, or siamesed, upstream of this point, in this case at a distance somewhat more than half of the diameter of hole 80.

Figure 3:
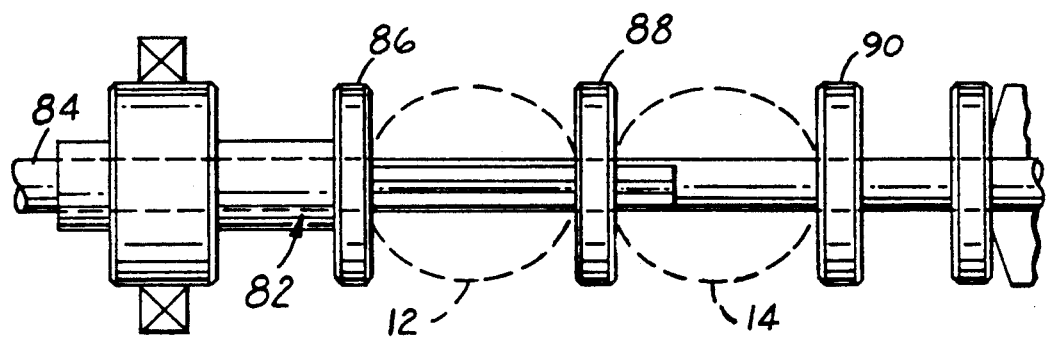
FIG. 3 is an enlarged cross-sectional view taken on a plane indicated by and viewed in the direction of the arrows III—III of FIG. 2.

FIG. 3 shows the one-piece barrel valve 82 that is inserted in the hole 80. The valve is constructed by die casting of aluminum around a central steel rod 84. This method provides for adequate rotational strength, as well as a degree of lateral flexibility desirable to prevent binding due to thermal or other distortions of the bore 80. The valve consists of the central steel rod 84 to which are die cast a number of annular disks 86, 88, 90. The disks are axially separated the width of the intake passages 12 and 14 in FIG. 1A for sealing communication between the passages and the cylinder head outside areas. Section 4A shows that the barrel valve at the passage 12, to be deactivated or controlled or blocked, has a cross-section, 92, resembling a rectangular throttle plate. Passage deactivation, or blocking, is achieved by the rotation of the barrel valve and throttle plate about 90°. In the open position shown in FIG. 2, the plate aligns with the flow direction and allows air and fuel passage. In the closed position, the valve blocks a very large fraction of the passage cross-section, thereby deactivating or blocking this passage.

Figure 4:
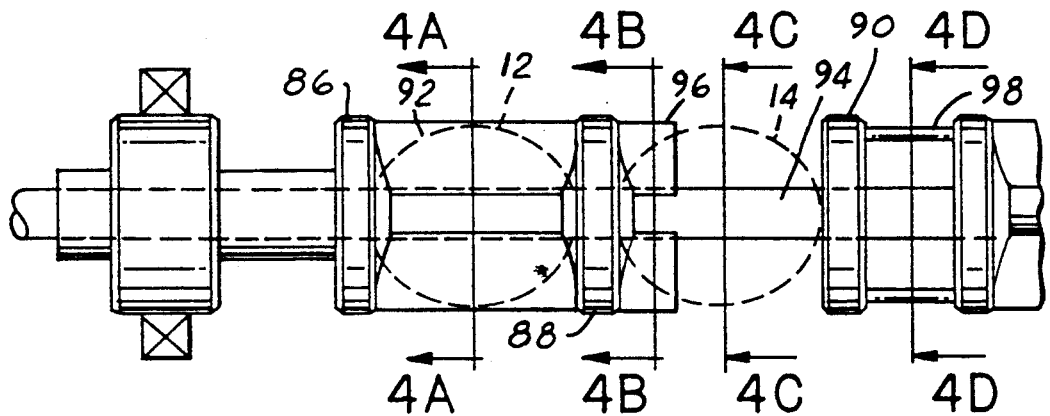
FIG. 4 is a cross-sectional view similar to that of FIG. 3, but showing the valve located out of the position shown in FIG. 3 for illustrating other details of the invention.
Figure 4A:
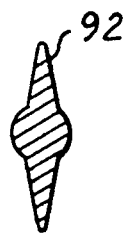
FIGS. 4A, 4B, 4C and 4D are cross-sectional views taken on planes indicated by and viewed in the direction of the arrows 4A—4A, 4B—4B, 4C—4C and 4D—4D of FIG. 4.
Figure 4B:
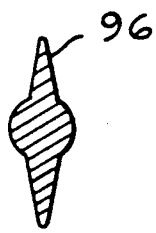
Figure 4C:

Referring to FIG. 1A, considering that fuel is being injected into both ports 18 and 20, the throttle plate is constructed of a height slightly less than the full diameter of bore 80 such that a leakage path is provided both at the top and bottom of the valve in cross-section 4A. This path will assure the ingestion into the cylinder of the fuel that is injected towards the closed, or deactivated, passage 12. In passage 14 leading to intake port 20, and indicated in FIG. 4C, is a small diameter cylindrical section 94, as shown in FIG. 4C, that can prevail across the entire width of the passage 14, if desired. This part of the flow path would be unaffected by the rotation of the valves 92. Alternatively, the primary passage 14 flow area can be reduced, if desired, as shown by the partial deactivation valve 96, indicated in Section 4B. The partial blocking of the flow area in port 20 will increase the air velocity and the swirl rate in the cylinder. The width of the partial deactivation valve 96 in passage 14 will also control the maximum swirl rate. Gradual reduction of swirl can be achieved by the gradual opening of the valve. Therefore, it will be seen from the above construction that at least one passage 12 can be essentially blocked, with small leakage around the top and bottom of the valve, to control the air flow and fuel flow into the engine. Also, the primary passage 14 can be entirely open or partially blocked by the use of a partial deactivation plate 96, as shown.

The design of the barrel valve 82 is such that special features are provided that will cope with deposit buildup in the intake ports. For example, the outside diameter of the barrel valve is machined to the full diameter at the disk sections 86, 88, and 90 to provide for guidance in the bore 80 as the valve is rotated. These disk sections are a constant width and uninterrupted around their circumferences, thereby disallowing deposit build-up that otherwise might hinder valve rotation. The throttle plate portions 92 and 96 of the valve are machined or cast about 2 mm smaller than a nominal full diameter. This feature provides for the leakage path, as described, and shown in FIG. 4A, and allows a degree of deposit build-up without blocking the movement of the valve. The entire valve may be coated to reduce friction and deposit adhesion. The coating could be a material such as polytetrafluorethylene or other materials known to those skilled in the art and suggested by this disclosure.

Experience has shown that the air and fuel dynamics limit the deposit build-up in the ports, and the thicker the deposit, the softer the deposit is. Therefore, with the clearance provisions as described, the valve will remain operable throughout the life of the engine.

Figure 4D:
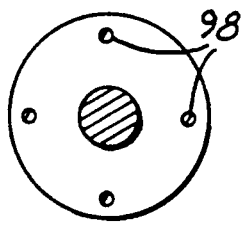

As described previously, the construction of the barrel deactivation valve is by die casting. The lateral flexibility described can be obtained by the use of small cross-sectional reinforcement bars 78 that can be cast between the disks during machining to provide stiffness. Subsequent to finished machining, the bars can be removed by cutting or by impact. These are shown in FIG. 4D. They could also be applied in FIGS. 4A and 4B, if desired.

In summary, the advantage of the barrel valve is that it combines the burn rate control feature of separated passages with the power and high-speed fuel efficiency characteristics of the conventional siamesed passages. The manufacture of the system should be simpler than that of the conventional deactivation valve that consists of many components with a complicated assembly process.

The disadvantages of conventional deactivation or shut-off valves have been pointed out beforehand. Additionally, in a V8 engine installation, for example, most modern-day, 4-valve per cylinder heads have valves at angled positions to the cylinder bore instead of vertical. Any attempt to use a conventional butterfly valve in the cylinder head would require that each intake passage be machined individually in a cylindrical fashion to assure accommodation of the circular butterfly valve. Also, there would be a need for individual attachment of each butterfly plate to its own shaft, connection of all of the shafts to each other and to some sort of bellcrank linkage, machining a vertical hole for the shaft from underneath the head because the valve train occupies the space on top, and making sure the shaft and linkage do not extend into an oil space, which would leak oil into the intake port passage. In a V8 engine, with the intake manifolding in the valley between banks of cylinders, the shaft would need to be installed from underneath the head, but in this type of engine, it is not easily accessible, and assembly of the shut-off valve, together with the individual injectors and other components would be difficult.

All of these disadvantages have forced engine designers to go outside the cylinder head to an adapter or a spacer, as shown in some of the prior art references, to provide the valving and linkages necessary. This increases complexity and cost.

The advantages of the barrel valve of this invention are, inter alia; its simplicity of construction and operation; i.e., its one-piece paddle-like design with guidance and sealing disks all integral; the capability of varying the amount of flow interruption through the passage by adjusting the size of the valve plate; the location of the valve in the cylinder head in a space normally not occupied by anything else, thereby permitting a hook-up of the cylinder head in a normal manner to siamesed intake manifolding; and the ability to insert the valve in a single constant diameter bore in the head close to the intake ports without interference with anything else.

While the invention has been described above and shown in the drawings in its preferred embodiment, it will be clear to those skilled in the arts to which it pertains that many changes and modifications may be made thereto without departing from the scope of the invention.

I claim:

1. A charge intake system for an automotive type internal combustion engine having intake manifolding connected to an engine cylinder head, including, the head having a pair of side-by-side charge intake ports for each cylinder therein, the manifolding including a single air flow containing runner extending towards the head and having a bifurcated portion within the head to form a pair of separate air flow passages connecting the runner to the pair of ports in a siamesed manner, a bore extending through the head transverse to and intersecting all of the intake passages, and a one-piece barrel type valve member extending through the length of the bore, the valve member containing throttle valve type elements selectively located in the passages for controlling charge flow into the ports and rotatable between passage opening and blocking positions, the runner containing fuel injection means axially positioned upstream of the bifurcated portion for spraying fuel equally into the pair of passages.

2. A charge intake system as in claim 1, wherein the bore and valve member are located closely adjacent the intake ports.

3. A charge intake system as in claim 1, the throttle valve elements being integrally formed on a single shaft extending the length of the bore, the valve member being slidably received as a whole into the bore.

4. A charge intake system as in claim 1, the bore being circular and of a constant diameter, at least a first one of the throttle elements for on of the passages being an essentially rectangular flat plate with a height dimension slightly less than the bore diameter, providing a charge flow leakage path past the plate when a throttle valve element is rotated to a position blocking the one passage.

5. A charge intake system as in claim 1, wherein the bifurcated portion begins at a distance upstream of the valve bore slightly greater than the radius of the bore.

6. A charge intake system as in claim 4, including a second flat throttle plate for the other of the passages, the second plate extending transversely only partially across the other passage for a partial blockage of the other passage when the valve element is rotated to the blocking position for that other passage.

7. A charge intake system as in claim 5, wherein the throttle plates are separated axially by valve member disk section integral with the shaft and of a flow sealing diameter essentially equal to that of the bore with only sufficient clearance therebetween to permit rotation of the valve member, thereby constituting the disk sections as guides for rotation of the valve member.

8. A charge intake system as in claim 7, wherein the disk sections are of constant width and of uninterrupted circumferential extent.

9. A charge intake system for an automotive internal combustion engine having at least one engine cylinder and a cylinder head overlying the cylinder, and an air manifold connecting ambient air to the head, the cylinder head having first and second side-by-side charge intake ports, the manifold for the one cylinder comprising a single log divided into first and second runners at a point closely adjacent the ports for separate connection of air to the ports, a fuel injector centrally located in the log upstream of the runners for spraying fuel equally into the runners, and a one-piece valve means extending through the head in a direction through and at right angle to the runners intersecting the runners, the valve means being rotatable and having first throttle plate means integral thereon located in at least one of the runners for variably opening or blocking charge flow through the one runner, the valve means being essentially barrel shaped and rotatable in essentially a constant diameter bore through the head, and having a number of axially separated constant diameter disk sections integral therewith mating with the bore for separating the throttle plate means and closing the ends of the bore thereby sealing the runners from flow therebetween, the disks and throttle plate means being fixedly mounted on a common shaft for rotation as a unit.

10. A charge intake system for an automotive internal combustion engine having at least one engine cylinder and a cylinder head overlying the cylinder, and an air manifold connecting ambient air to the head, the cylinder head having first and second side-by-side charge intake ports, the manifold for the one cylinder comprising a single log divided into first and second runners at a point closely adjacent the ports for separate connection of air to the ports, a fuel injector centrally located in the log upstream of the runners for spraying fuel equally into the runners, and a one-piece valve means extending through the head in a direction through and at right angle to the runners intersecting the runners, the valve means being rotatable and having first throttle plate means integral thereon located in at least one of the runners for variably opening or blocking charge flow through the one runner, the valve means having a second partial throttle plate means integral therein located in the other of the runners for variably partially blocking or opening the charge flow through the other runner, the valve means being essentially barrel shaped and rotatable in essentially a constant diameter bore through the head, and having a number of axially separated constant diameter disk sections integral therewith mating with the bore for separating the throttle plate means and closing the ends of the bore thereby sealing the runners from flow therebetween, the disks and throttle plate means being fixedly mounted on a common shaft for rotation as a unit.

11. A charge system for an automotive internal combustion engine as in claim 9, wherein the first throttle plate means is of a height slightly less than the diameter of the bore providing a small clearance charge flow leakage path past the plate means for ingestion into the engine of fuel sprayed into the one runner.

12. A charge system for an automotive internal combustion engine as in claim 10, wherein the first throttle plate means is of a height slightly less than the diameter of the bore providing a small clearance charge flow leakage path past the plate means for ingestion into the engine of fuel sprayed into the one runner.

13. A charge intake system for an automotive internal combustion engine as in claim 9, wherein the bore is located closely adjacent the intake ports, with the runners beginning upstream of the bore at a distance therefrom slightly more than the radius of the bore.

14. A charge intake system for an automotive internal combustion engine as in claim 10, wherein the bore is located closely adjacent the intake ports, with the runners beginning upstream of the bore at a distance therefrom slightly more than the radius of the bore.

15. A charge intake system for an automotive internal combustion engine as in claim 13, wherein the shaft is of steel, and the disk sections and throttle plates are of aluminum die cast around the shaft providing rotational strength and lateral flexibility to prevent binding of the valve members due to thermal and other bore distortions.

16. A charge intake system for an automotive internal combustion engine as in claim 14, wherein the shaft is of steel, and the disk sections and throttle plates are of aluminum die cast around the shaft providing rotational strength and lateral flexibility to prevent binding of the valve members due to thermal and other bore distortions.

* * * * *